United States Patent [19]

Flik et al.

[11] Patent Number: 5,377,126
[45] Date of Patent: Dec. 27, 1994

[54] NON-CONTACT TEMPERATURE MEASUREMENT OF A FILM GROWING ON A SUBSTRATE

[75] Inventors: Markus I. Flik, Boston; Alfredo Anderson, Watertown; Byungin Choi, Cambridge, all of Mass.

[73] Assignee: Massachusetts Institute of Technology, Cambridge, Mass.

[21] Appl. No.: 759,427

[22] Filed: Sep. 13, 1991

[51] Int. Cl.$^5$ .............................................. G01J 5/00
[52] U.S. Cl. ..................................... 364/557; 364/563; 374/120; 374/121; 427/10; 505/829; 505/842
[58] Field of Search ............... 340/589; 427/8, 9, 10; 374/7, 120, 121, 164; 204/298.03, 298.11; 364/562, 563, 557

[56] References Cited

U.S. PATENT DOCUMENTS

| | | | |
|---|---|---|---|
| 4,396,640 | 8/1983 | Rocheleau et al. | 427/8 |
| 4,979,134 | 12/1990 | Arima et al. | 364/557 |
| 5,118,200 | 6/1992 | Kirillov et al. | 374/120 |
| 5,132,922 | 7/1992 | Khan et al. | 364/557 |
| 5,155,337 | 10/1992 | Sorrell et al. | 219/411 |
| 5,156,461 | 10/1992 | Moslehi et al. | 374/121 |
| 5,166,080 | 11/1992 | Schietinger et al. | 374/7 |
| 5,188,458 | 2/1993 | Thompson et al. | 374/121 |

OTHER PUBLICATIONS

Singh, Rajendra, "Rapid Isothermal Processing," SPIE-The International Society For Optical Engineering, vol. 1189, (Oct. 1989) p. 30.
Reid, J. Michael, "Modeling Of Emissivity Effects For Use In Control Of Rapid Thermal Processing Equipment," (thesis), 1990.
Harris, John Adams, "Temperature Measurement And Control In Rapid Thermal Processing Of Silicon Wafers," (thesis), 1989.
Annual Review of Heat Transfer, C. L. Tien, ed., vol. 3, pp. 115–144, 1990, "Thermal Phenomena In High-Tc Thin-Film Superconductors", M. I. Flik and C. L. Tien.
Pochi Yeh, 1988, "Optical Waves in Layered Media" John Wiley & Sons, New York, pp. 83–101.
Materials Researchy Society Symposium Proceedings, vol. 52 "Rapid Thermal Processing", T. O. Sedgwick, T. E. Seidel, and B. Y. Tsaur, eds.
IEEE Transactions on Semiconductor Manufacturing. vol. 3 No. 4, Nov. 1990 pp. 183–188 "A Global Model For Rapid Thermal Processors", F. Yates Sorrell, John A. Harris, and Ronald S. Gyurcski.
J. Vac. Sci Technol A 8(1) Jan./Feb., 1990, pp. 84–92 "Infrared–laser Interferometric Thermometry: A Nonintrusive Technique For Measuring Semiconductor Wafer Temperature", V. M. Donnelly and J. A. McCaulley.
Appl. Phys. lett 56(10), Mar. 5, 1990, "Silicon Temperature Measurement by Infrared Transmission For Rapid Thermal Processing Applications", pp. 961–963, J. C. Sturm, P. V. Schwartz, and P. M. Garone.
Stone, John M., "Radiation and Optics, An Introduction To The Classical Theory," (McGraw-Hill Book Company, Inc.), pp. 389–419.
Born, Max et al., "Principles of Optics, Electromagnetic Theory Of Propagation, Interference And Diffraction of Light," (Pergamon Press), pp. 51–70.

Primary Examiner—Emanuel T. Voeltz
Assistant Examiner—Eric W. Stamber
Attorney, Agent, or Firm—Wolf, Greenfield & Sacks

[57] ABSTRACT

Apparatus and method for non-contact temperature measurement of a film growing on a substrate which accounts for the change in emissivity due to the change in film thickness. The system employs an adaptively calibrated pyrometer wherein the substrate emittance is continuously computed so that the temperature measurement is accurate regardless of the emittance variation. The new system is easily constructed by adding data processing system software and hardware to conventional pyrometers.

4 Claims, 6 Drawing Sheets

NON-CONTACT TEMPERATURE MEASUREMENT OF A FILM GROWING ON A SUBSTRATE

This invention was made with government support under Contract Number F19628-90-C-0002 awarded by the Department of the Air Force. The government has certain rights in the invention.

This invention was made with government support under contract Number MDA972-90-C-0021 awarded by the Defense Advanced Research Projects Agency. The government has certain rights in the invention.

FIELD OF THE INVENTION

This invention concerns a non-contact radiance temperature measurement technique for determining the temperature of a film growing on a substrate which accounts for the change in emissivity due to the changing film thickness.

BACKGROUND OF THE INVENTION

The controlled deposition of a film on a substrate is a critically important process in the electronics and many other industries. One of the parameters which must be tightly controlled during such deposition is the film temperature. For example, this is particularly important for fabricating semiconductor multi-layer structures from silicon (Si) or gallium arsenide (GaAs). It is also critical to obtaining a high-$T_c$ (high critical temperature) superconductor film of optimal quality on a substrate. To date, the lack of an appropriate temperature measurement and control system is one of the main obstacles in high-$T_c$ superconductor film technology.

The recent discovery of superconductivity above 90° K. in the compound $YBa_2Cu_3O_{7-\delta}$ created the potential for new applications in microwave devices and hybrid semiconductor-superconductor devices. For the first time, superconductivity occurred at temperatures where the properties of semiconductors can be optimized. These promising applications require the deposition of high-quality superconducting thin films on semiconductors.

A high quality superconducting film must exhibit a high critical current density $J_c$ greater than $10^5$ Acm$^{-2}$ at the operating temperature. A narrow transition to the superconducting state, of the order of a few degrees Kelvin, and a high temperature of zero electrical resistance are also required. The film quality strongly depends on the substrate surface temperature during deposition.

Films deposited onto low temperature substrates require an annealing process to become superconducting. This annealing process, at about 900° C., raises several problems, including chemical reaction and diffusion between the film-substrate composite, which degrade the superconducting properties, and differences in thermal expansion coefficients, which may cause microcracks.

In-situ growth without an annealing process is the preferred method of applying superconducting films. In this procedure, films are deposited on a heated substrate and cooled in an oxygen environment. Laser ablation and sputtering deposition processes have yielded the best films of high-$T_c$ superconductors (D. W. Murphy et al., 1988, "Processing Techniques for the 93K Superconductor $Ba_2YCu_3O_7$, Science, Vol. 241, pp. 922-930). A critical parameter in the in-situ growth process is the temperature of the substrate at the film-substrate interface (H. C. Li et al., 1988, "In-Situ Preparation of a Y—Ba—Cu—O Superconducting Thin Film by Magnetron Sputtering," Appl. Phys. Lett., Vol. 52, pp. 1098-1100). It influences film orientation, stoichiometry and crystallinity. Since the temperature drop across the deposited film is small, the substrate temperature at the film interface is approximately equal to the film temperature. Previous work has shown that this temperature must be held at a precise value to ensure good film quality (R. L. Sandstrom et al., 1988, "Reliable Single-Target Sputtering Process for High-Temperature Superconducting Films and Devices," Appl. Phys. Lett., Vol. 53, pp. 444-446). As it is very difficult to measure directly the substrate temperature during deposition, the temperature of the substrate holder is usually reported. This temperature, however, can be up to 150° K. higher than the substrate temperature (A. Inam et al., 1988, "As-Deposited High $T_c$ And $J_c$ Superconducting Thin Films Made at Low Temperatures," Appl. Phys. Lett., Vol. 53, pp. 908-910). A solution to this problem is required before high-$T_c$ superconductor devices can be commercialized.

This same problem of accurately measuring the temperature of a film growing on a substrate has long been a problem in the semiconductor industry. It has undergone intensive study by a number of research institutes and chip manufacturers, but without producing a practicable solution.

Conventional temperature control systems use thermocouples attached to the substrate holder, because they cannot be attached directly to the substrate. As previously indicated, the temperature of the substrate holder may differ significantly from that of the substrate and since the temperature difference is unknown, this is not an adequate solution to the problem.

Pyrometric non-contact temperature measurement of high-temperature sources has been known for sixty years. Such measurements make use of the Planck radiance formula:

$$N(\lambda) = \epsilon(\lambda) C_1 \lambda^{-5} [exp(C_2/\lambda T) - 1]^{-1} \quad (1)$$

where: N is the spectral radiance, $\epsilon(\lambda)$ is the emissivity of the material at wavelength $\lambda$, T is the thermodynamic temperature, and $C_1$ and $C_2$ are Planck radiation constants. Strictly speaking, many pyrometry techniques use the Wien approximation to the Planck radiance formula $$N(\lambda) = \epsilon(\lambda) C_1 \lambda^{-5} exp(-C_2/\lambda T) \quad (2)$$

which is valid for small wavelengths. By measuring the spectral radiance, N, at a wavelength $\lambda$, and by supplying the appropriate values for $\epsilon$, $C_1$, and $C_2$, an estimate of the temperature of the source can be calculated.

Historically there have been two distinct techniques for such calculations. The older technique, ratio pyrometry, involves measurement of the radiance at a number of different wavelengths in an attempt to eliminate the emissivity term by making ratios of the measured radiances. In the newer method, multiwavelength pyrometry, radiance emission measurements are also taken at several wavelengths. These data are then processed by a variety of techniques, the most accurate of which are the least-squares-based multiwavelength techniques which involve fitting the radiance data to an assumed emissivity functional form.

Ratio techniques have not, in general, provided adequately accurate temperature estimates for broad industrial usage. The often large inaccuracies of the ratio techniques have been attributed to the fact that they require unrealistic assumptions to be made about the nature of the emissivity, $\epsilon$, in the Planck formula. Ratio techniques assume that both (in the case of two-color) or certain (in the cases of three-color or four-color) of the emissivities at the measured wavelengths be equal. Multiwavelength, particularly least-squares-based, techniques have been somewhat more successful, largely because they more reasonably assume a wavelength-dependent emissivity function, rather than that all or some of the emissivities are equal. In fact, with certain materials, these techniques have proven to be accurate to within one per cent. With other materials, however, results have been unsatisfactory. It has been assumed by previous investigators that the unsatisfactory results have been due to two sources: first, an incorrect form or lack of sufficient complexity of the assumed emissivity model function; and second, so-called "correlation effects" due to the inability of curve-fitting routines to distinguish in certain circumstances between changes in emissivity and changes in temperature.

Pyrometry faces a particular obstacle when it is applied to substrate temperature measurement in film growth processes. Due to absorption and interference within the film, the substrate emissivity changes with increasing film thickness. Because the spectral emissivity of the film-substrate composite depends on the ratio of the wavelength to the film thickness, the emissivity change with film growth depends on the wavelength.

Attempts have also been made to determine the substrate temperature by analyzing the heat transfer between the substrate and other parts of the deposition chamber. Nevis and Tasone calculated the silicon wafer temperature in sputtering and sputter-etching systems based on thermal radiation and heat transfer (B. E. Nevis et al., 1974, "Low-Voltage Triode Sputtering and Backsputtering with Confined Plasma: Part IV. Heat Transfer Characteristics," J. Vac. Sci. Technol., Vol. 11, pp. 1177–1185). Their results showed that the wafer temperature depends significantly on the surface emissivity. They did not analyze the change of emissivity during film growth. Other researchers investigated substrate heating rates by sputtering, but they did not extend their study to predict the film temperature (J. A. Thornton et al., 1984, "Substrate Heating Rates for Planar and Cylindrical-Post Magnetron Sputtering Sources," Thin Solid Films, Vol. 19, pp. 87–95).

It is an object of this invention to provide a method and apparatus for accurately measuring the temperature of a film as it changes in thickness, which account for the change in emissivity with changing film thickness.

SUMMARY OF THE INVENTION

According to this invention, a substrate temperature control system is provided which employs an adaptively calibrated pyrometer. The system includes apparatus for continuously computing the substrate emittance so that the temperature measurement is accurate regardless of the emittance variation with changing film thickness. The new pyrometer is constructed by adding a data processing system and novel software to already existing pyrometers and can be easily developed based on conventional pyrometers.

The pyrometer produces signals proportional to the radiance from the surface of the substrate. This radiance signal is processed by a computing apparatus which includes means for determining the corresponding blackbody temperature and means for continuously computing the changing emissivity. The emissivity is determined as a function of the optical constants of the film-substrate composite materials and the film thickness. The variation in film thickness must be known; for example it can be determined based on a controlled rate of deposition, or measured interferometrically. A temperature controller generates a control signal based on the difference between the real temperature and a prescribed temperature so as to cause the substrate to approach the prescribed temperature.

Since the temperature measurement is performed by a pyrometer, it does not interfere with the deposition process. Due to its non-invasive nature, the control system can be applied to any film deposition system, such as sputtering, laser ablation, molecular beam epitaxy (MBE) and chemical vapor deposition (CVD).

DETAILED DESCRIPTION

Figure 1:
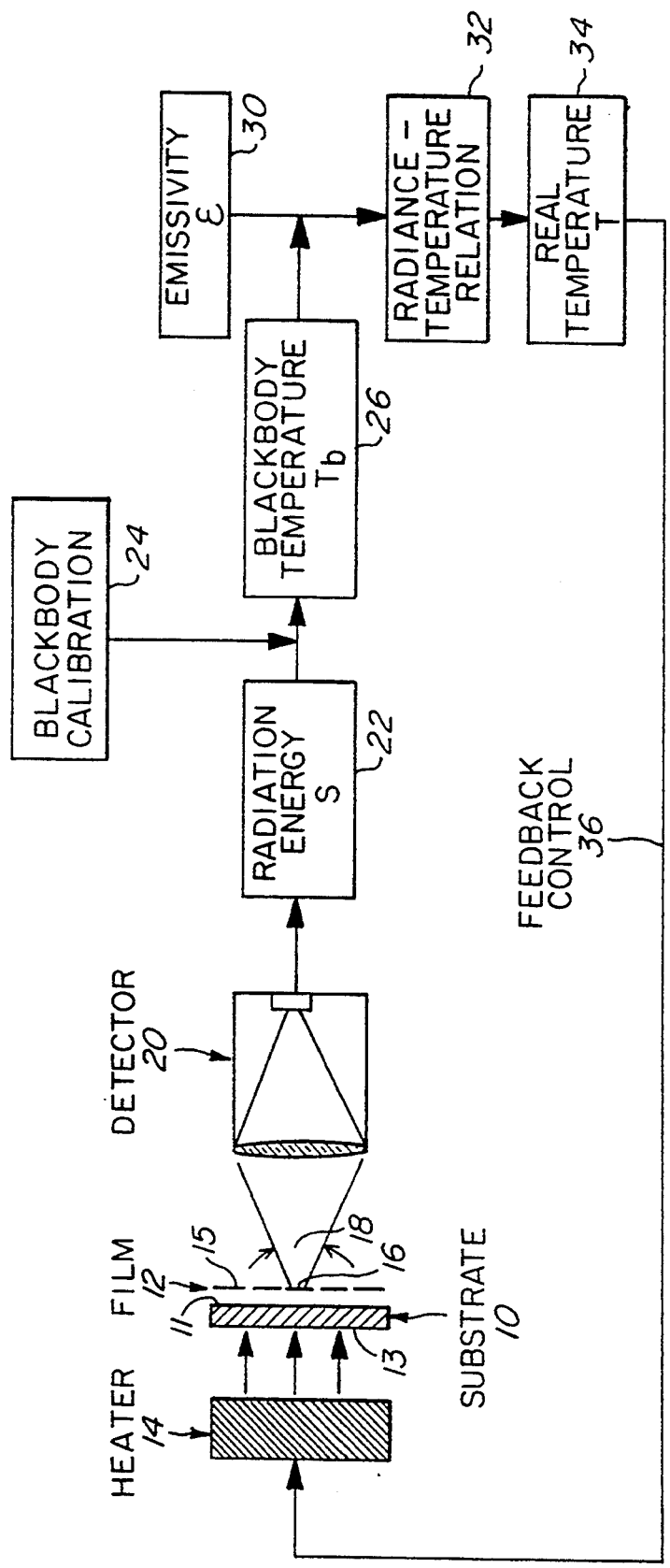
FIG. 1 is a schematic representation of the measurement system and technique of this invention whereby the real temperature of the surface of the substrate is determined and preferably is fed back to a heater controlling the temperature of the composite.
Figure 1A:
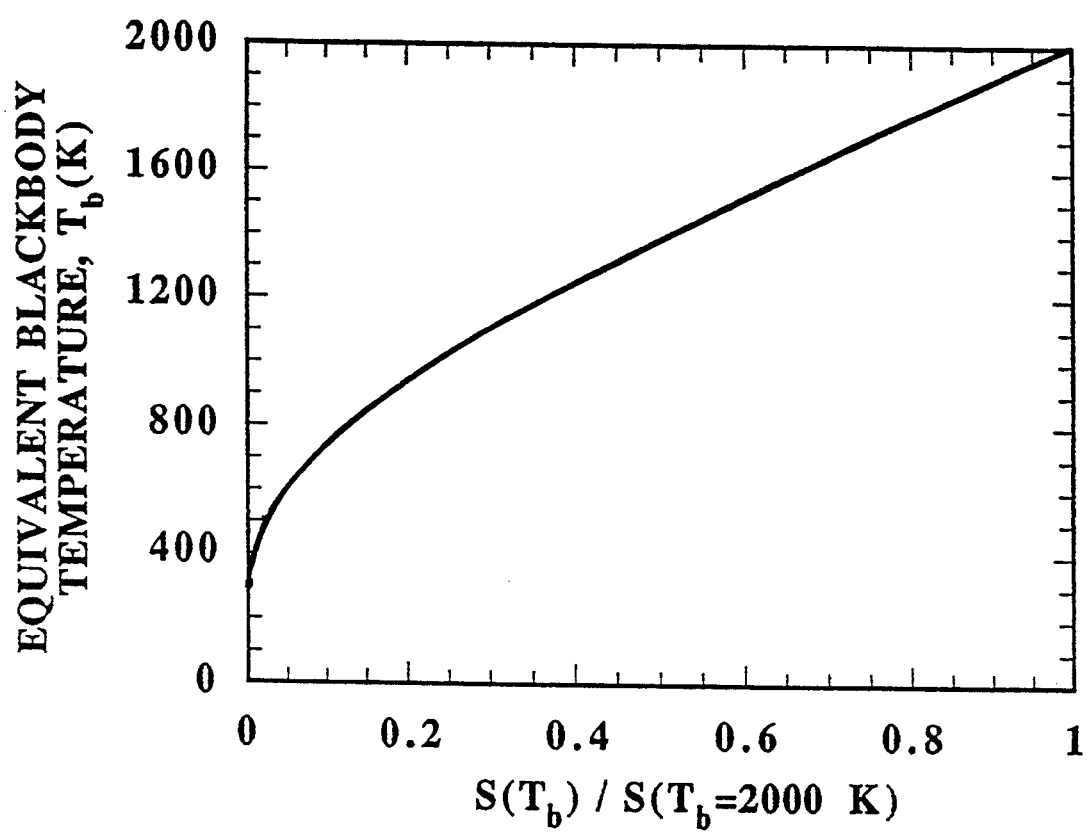
FIG. 1a is a graph showing a blackbody calibration.

FIG. 1 is a block diagram showing the operating principle of this invention. A substrate 10 has applied to its front planar surface 11 a film 12 which is undergoing a change in thickness, transverse to the plane of surface 11. A heater 14 applies heat to the back surface 13 of the substrate 10 at a controlled rate, in order to maintain the temperature at the film surface 15 at a predetermined value. Radiance (i.e., radiant energy) from the surface 15 of the film-substrate composite is transmitted to detector 20. The radiance emitted from an area 16 on surface 15, as defined by a cone 18 of angle $\omega$, is transmitted to detector 20 and converted into an electronic radiation energy signal S (22). The signal S is converted by a conventional blackbody calibration technique 24 to an equivalent blackbody temperature $T_b$(26). Conversion of the radiation energy signal S to equivalent blackbody temperature $T_b$ is a well-known calibration commonly done by plotting the corresponding values of $S(T_b)/S(T_b=2000 \text{ K})$ and $T_b$ on a graph as the X and Y coordinates, respectively. An example of this conversion technique is shown in FIG. 1a. Practically, the calibration curve is obtained by measuring the radiation signal S from a blackbody with temperature $T_b$.

In accordance with this invention, the blackbody temperature $T_b$ is then operated on by an emissivity function $\epsilon$ (30). This function 30 accounts for the change in emissivity with increasing film thickness. The result is a very accurate value for the real temperature signal T (block 34), as determined by a radiance/temperature relation 32. The signal T is then fed back via control line 36 to heater 14 and compared with a preset value in order to keep the temperature T at surface 15 at the preset value by increasing or decreasing the amount of heat supplied to the substrate.

To convert the blackbody temperature $T_b$ to the real temperature T, a radiance/temperature relation 32 is utilized which includes the emissivity function of this invention. The derivation of the radiance/temperature relation and the emissivity function will now be described.

The electronic radiance signal S from the detector 20 is proportional to the total energy which arrives at the detector 20 per unit time from the area 16 on the suface 15 of the film-substrate composite. This may be a voltage (V) or current (A) signal. The entire surface is assumed to be at the same temperature as area 16. The spectral responsivity of the detector $R_d(\lambda)$ depends on the wavelength of the radiance from the composite and is defined as the signal produced per unit energy arrived (V/watt or A/watt):

$$R_d(\lambda) = dS/d\Phi \tag{3}$$

The change in energy flux $d\Phi$ is defined as:

$$d\Phi = A_m \omega_m e_b(\lambda, T(t)) \epsilon(\lambda, t) \tau_o(\lambda) d\lambda / \pi \tag{4}$$

where:
 $\Phi$ = radiation energy arriving at the detector per unit time [watts]
 t = time [seconds]
 $A_m$ = measured spot size [m²]
 $\omega_m$ = solid angle of spot subtended by aperture
 T = real temperature
 $e_b$ = blackbody hemispherical emissive power
 $\epsilon$ = emissivity of the surface (here film-substrate composite)
 $\tau_o$ = transmittance of filter, lens, window and whatever exists in beam path
 $\pi$ = 3.1415926536 . . .
 $\lambda$ = the wavelength of the radiance.

Rearranging terms and integrating produces the following expression for S(t):

$$S(t) = C \int_{\lambda_1}^{\lambda_2} \epsilon(\lambda, t) e_b(\lambda, T(t)) R(\lambda) d\lambda \tag{5}$$

where:
 $\lambda_1, \lambda_2$ are the lower and upper limits of the operating spectral range
 $C = A_m \omega_m / \pi$ is a constant independent of wavelength
 $R(\lambda) = R_d(\lambda) \tau_o(\lambda)$ is defined as the spectral responsivity of the entire pyrometer system.

Similarly, S(t) can be represented by the blackbody temperature $T_b(t)$ as follows:

$$S(t) = C \int_{\lambda_1}^{\lambda_2} e_b(\lambda, T_b(t)) R(\lambda) d\lambda \tag{6}$$

By equating equations 5 and 6 the following radiance/temperature relation is obtained:

$$S(t) = C \int_{\lambda_1}^{\lambda_2} \epsilon(\lambda, t) e_b(\lambda, T(t)) R(\lambda) d\lambda = \tag{7}$$

$$C \int_{\lambda_1}^{\lambda_2} e_b(\lambda, T_b(t)) R(\lambda) d\lambda$$

where:
 S(t) is the electronic radiance signal at time t,
 $\epsilon(\lambda, t)$ is the emissivity function at wavelength $\lambda$ and time t and depends on the film thickness $d_1$, where $d_1$ changes with time,
 T(t) is the real temperature of the film-substrate composite,
 $T_b$ is the equivalent blackbody temperature of the composite,
 $e_b$ is the blackbody hemispherical emissive power,
 $\lambda_1$ and $\lambda_2$ are the lower and upper wavelength limits,
 $R(\lambda)$ is the spectral responsivity of the pyrometer system, where $R(\lambda) = R_d(\lambda) \tau_o(\lambda)$,
 $R_d(\lambda)$ is the electronic radiance signal per unit energy, where $R_d(\lambda) = dS/d\Phi$,
 $\Phi$ is the radiance arriving at the detector apparatus per unit time,
 t is time,
 $\lambda$ is the wavelength of the radiance, and
 C is a geometric constant based on the detector apparatus and is independent of wavelength.

With knowledge of the emissivity function $\epsilon(\lambda, t)$ and the spectral responsivity $R(\lambda)$, one can calculate the real temperature T(t) from the radiance/temperature relation, equation (7).

The emissivity function $\epsilon$ is a directional emissivity. It depends on the angle between the surface normal and the pyrometer line of sight. If the film material is anisotropic, such as the superconducting compound $YBa_2Cu_3O_{7-\delta}$, then for oblique incidence, the emissivity function must account for the anisotropy of the film dielectric function.

The typical thickness of a superconducting film is 1 micron, which is of the order of magnitude of the wavelength in the near-infrared. Superconducting and semiconducting films are deposited on substrates kept at a temperature of approximately 800° to 1,000° K. Hence, the wavelength of maximum spectral density is around 3 microns. Since this is the order of the film thickness, the emissivity of the film-substrate composite is affected by wave interference in the film.

The instantaneous substrate emittance, $\epsilon = \epsilon(\lambda, t)$, is calculated based on thin-film optics which yields the directional spectral reflectance of the opaque film-substrate composite. Kirchoff's law states that the spectral directional emissivity is equal to the spectral directional absorptivity (R. Siegel and J. R. Howell, 1891, Thermal Radiation Heat Transfer, Hemisphere, New York, p. 63). Hence, one minus the directional spectral reflectivity is the directional spectral emissivity function. For this calculation to be possible, the lower and upper wavelength limits $\lambda_1$ and $\lambda_2$ must be chosen such that the substrate is opaque for $\lambda_1 < \lambda < \lambda_2$. In the case of LaAlO$_3$ and SrTiO$_3$ used for deposition of YBa$_2$Cu$_3$O$_{7-\delta}$ superconducting films, a possible range is 9.5 μm $< \lambda <$ 14μ. A description of the thin-film optics technique is contained in P. Yeh, 1988, "Optical Waves in Layered Media," John Wiley & Sons, New York.

Figure 3:
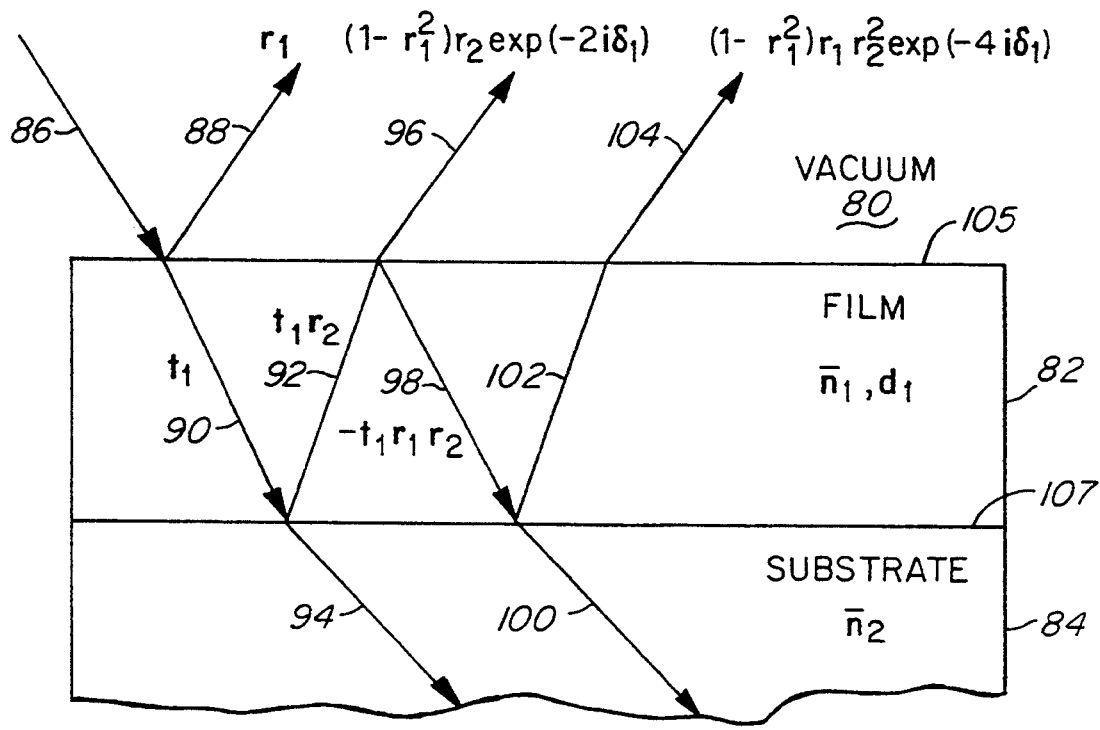
FIG. 3 is a schematic representation showing the derivation of the emissivity of the opaque film-substrate composite based on thin film optics.

Using thin-film optics the emissivity of the film-substrate composite can be expressed as a function of the optical constants of the film-substrate composite, and the film's thickness. FIG. 3 illustrates this analysis by showing a substrate 84 having a refractive index $\bar{n}_2$, a film 82 having a refractive index $\bar{n}_1$ and thickness $d_1$ transverse to the planar interface 107 between the film 82 and substrate 84, and vacuum 80 having a planar interface 105 with film 82. The emissivity of the film-substrate composite is related to the reflectance R of the composite as set forth below, where the substrate holder is opaque and the indicated relation is substituted for R:

$$\epsilon = 1 - R = 1 - \left| \frac{r_1 + r_2 \exp(-2i\delta_1)}{1 + r_1 r_2 \exp(-2i\delta_1)} \right|^2 \quad (8)$$

where:

$$r_1 = \frac{1 - \bar{n}_1}{1 + \bar{n}_1} \quad r_2 = \frac{\bar{n}_1 - \bar{n}_2}{\bar{n}_1 + \bar{n}_2} \quad (9, 10)$$

$$\delta_1 = \frac{2\pi}{\lambda} \bar{n}_1 d_1 \quad (11)$$

and where:
$\bar{n}_1$ is the complex refractive index of the film defined by $\bar{n}_1 = n_1 - ik_1$,
$\bar{n}_2$ is the complex refractive index of the substrate defined by $\bar{n}_2 = n_2 - ik_2$,
$d_1$ is the film thickness which varies over time t,
$k_1$ is the extinction coefficient of the film,
$k_2$ is the extinction coefficient of the substrate,
$r_1$ is the Fresnel coefficient of the film-vacuum interface,
$r_2$ is the Fresnel coefficient of the film-substrate interface,
$\delta_1$ is the phase change across the thickness of the film, and
$\lambda$ is the wavelength of the detected radiance.

The application of equations (8) to (11) requires that the standard deviation of the surface profiles of the film-vacuum and film-substrate interfaces is much smaller than the wavelength. Since the wavelength of highest optical energy density is about 3 μm, this translates into a required surface profile standard deviation of less than 300 nm, which is well satisfied by superconducting and semiconducting films.

As shown in FIG. 3, the amplitude of an incoming plane-wave radiation ray 86 striking the interface 105 between the film and vacuum includes portion $t_1$ (90) which is transmitted through the interface while another portion $r_1$ (88) is reflected. The transmitted beam 90 is similarly transmitted and reflected at the second interface 107 between the film-substrate composite, as represented by transmitted beam amplitude portion 94, and reflected beam amplitude portion 92 of value $t_1 r_2$. Beam 92 returns to the first interface 105 and is similarly transmitted as beam 96 or reflected as beam 98 back into the film, the respective beams having the amplitude values relative to the incident amplitude indicated in FIG. 3. Beam 98 at interface 107 is similarly split into transmitted beam 100 and reflected beam 102, with the amplitude of reflected beam 102 including portion 104 transmitted at the first interface 105. The phase of the reflected beam 96 is different from the phase of the inflected beam 88 by a factor of $\exp(-2i\delta_1)$, and the phase of the reflected beam 104 differs from that of beam 88 by a factor of $\exp(-4i\delta_1)$. Adding the amplitude of all the reflected beams produces a value for the reflectance of the film-substrate composite as defined above in equation 8.

Figure 2:
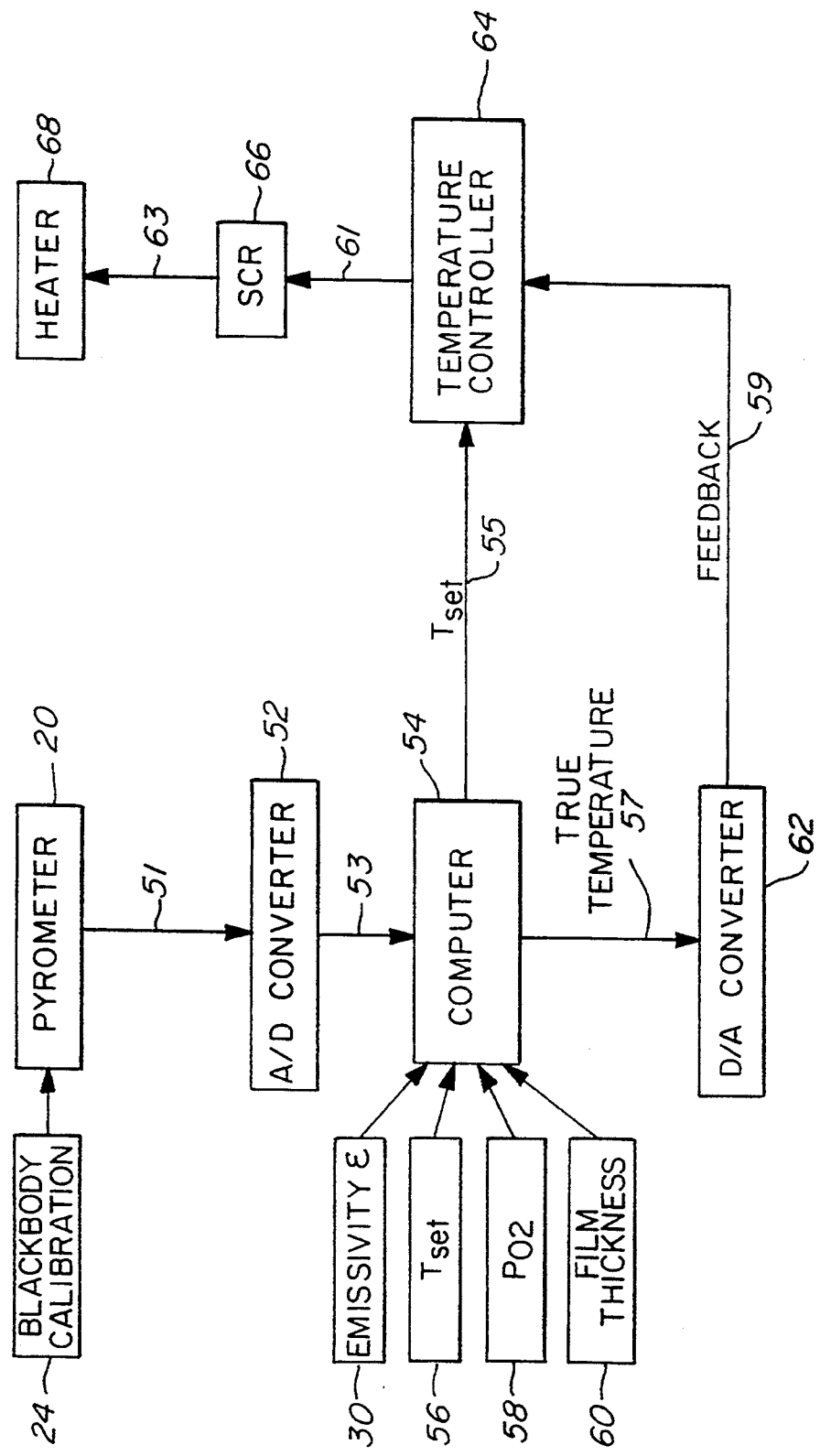
FIG. 2 is a schematic representation of the preferred apparatus of this invention showing the interaction of the pyrometer, computer, temperature controller and heater.

FIG. 2 is a diagrammatic representation of the apparatus of this invention, as applied to the deposition of YBa$_2$Cu$_3$O$_{7-\delta}$ superconducting films. A pyrometer 20 serves as the radiation detector and outputs an analog signal on line 51 which is converted by analog/digital converter 52 to a digital signal 53. The digital signal 53 is input to computer 54 as the equivalent blackbody temperature $T_b$. Four additional values are inserted or stored in computer 54 including emissivity $\epsilon$ (30), $T_{set}$ (56), the desired temperature of the substrate, $P_{O2}$ (58), the oxygen partial pressure in the deposition chamber, and film thickness $d_1$ (60). In cases involving a controlled rate of deposition, the film thickness $d_1$ varies with time t in a known manner. This known relation between the film thickness and time must be supplied to or determined by the computer 54 in order to solve the radiance/temperature relation. If a doped semiconductor is being deposited, then the oxygen pressure 58 is replaced by information on the doping level.

The computer 54 provides the preset temperature $T_{set}$ on line 55 to a temperature controller 64. The computer 54 also calculates the real temperature T(t) and outputs an electronic temperature signal corresponding thereto on line 57 to digital/analog converter 62. The digital temperature signal is converted to an analog temperature signal and sent on feedback line 59 to temperature controller 64. The temperature controller compares the real temperature T(t) and the preset temperature $T_{set}$ and sends out a control signal on line 61 which is amplified by silicon controlled rectifier 66, and provided on line 63 to heater 68. Heater 68 provides the heat input to the rear surface of the substrate holder.

Figure 4:
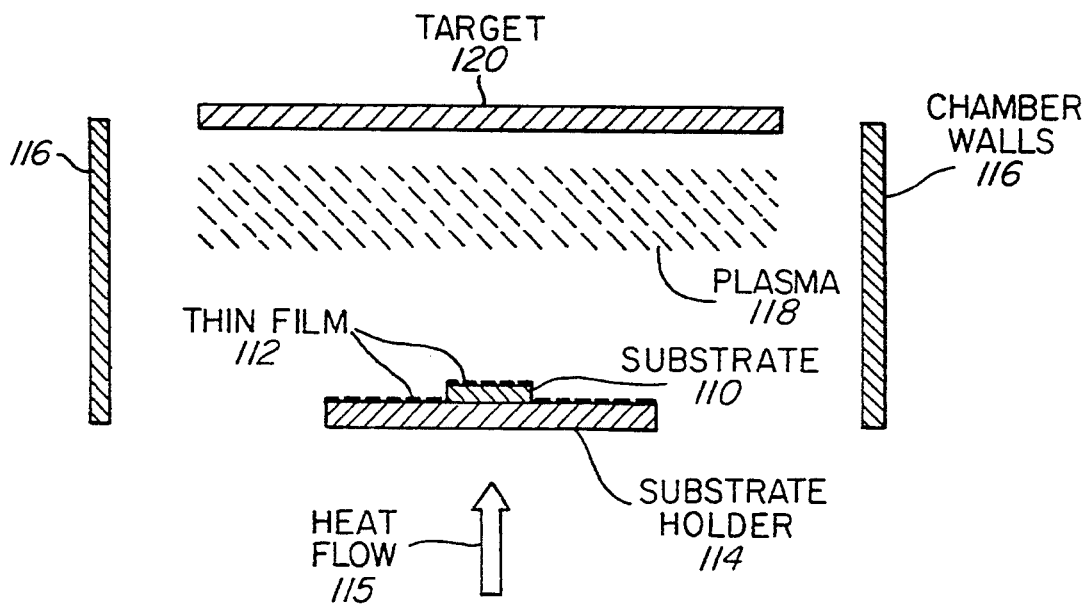
FIG. 4 is a schematic representation of a sputtering apparatus for depositing a thin film on a substrate.

In a sputtering deposition chamber, as shown schematically in FIG. 4, a substrate 110 is mounted on a substrate holder 114 and heat is applied as shown by arrow 115 to the rear surface of the substrate holder. The chamber is constructed from walls 116. A sputtering gas, usually argon, at a very low pressure of about 10 Pa, is converted to a plasma 118 of positive argon ions by a radio-frequency electric field. A target 120, made of the compound which forms the film, is given a negative electric potential. The argon ions are accelerated toward the target, ablating the target material, which settles on the substrate and forms a thin film 112 on the substrate and substrate holder. The film thickness increases over time and the final thickness is of the order of micrometers for a typical high-$T_c$ superconductor on a crystalline substrate. A further explanation of the thermal effects in processing high-$T_c$ thin film super-conductors is contained in M. I. Flik and C. L. Tien, 1990, "Thermal Phenomena In High-$T_c$ Thin Film Superconductors," Chapter 4, Annual Review of Heat Transfer, C. L. Tien, ed. Vol. 3, pp. 115–144, Hemisphere, Washington, D.C., which is hereby incorporated by reference in its entirety.

Figure 5:
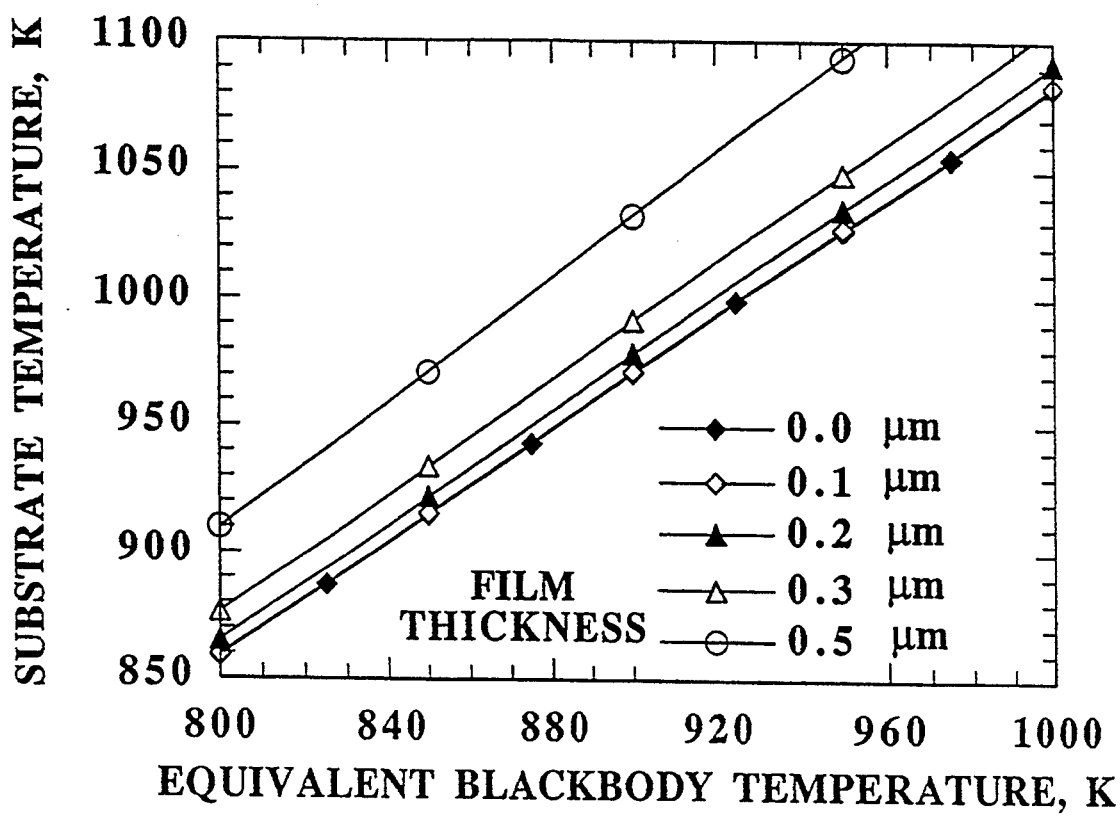
FIG. 5 is a graph showing the increasing difference between the uncalibrated pyrometer temperature and the blackbody temperature with increasing film thickness.
Figure 6:
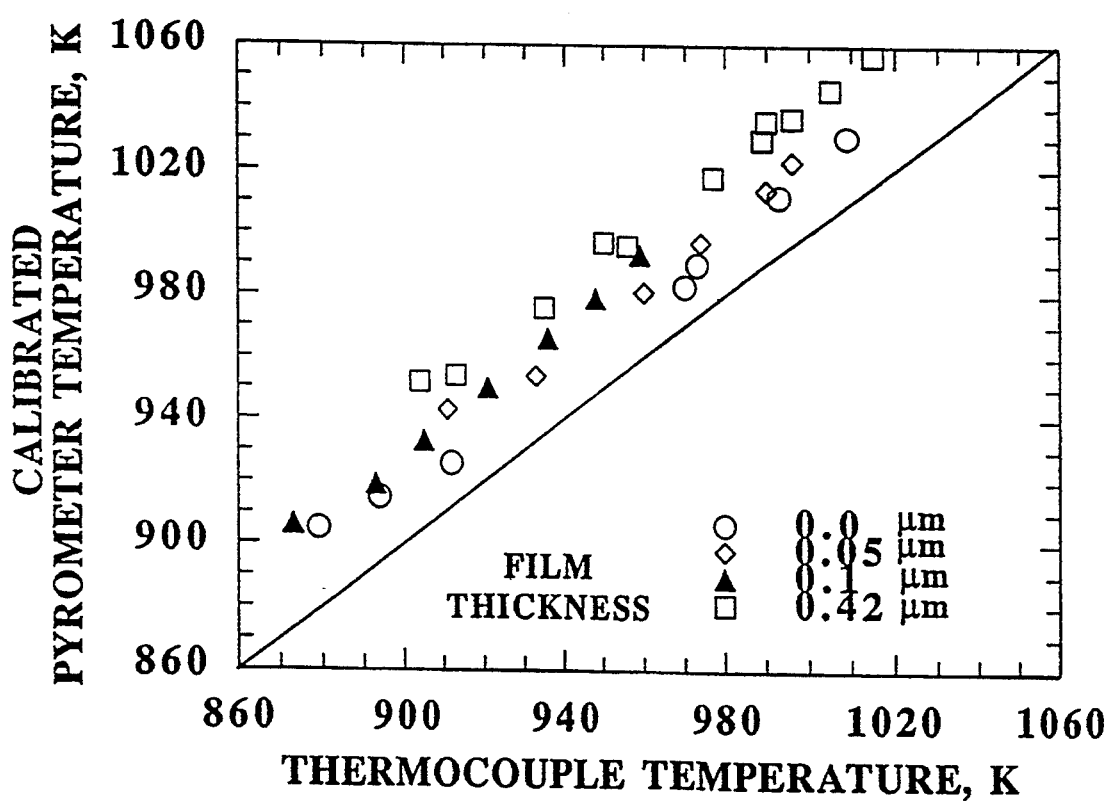
FIG. 6 is a graph showing the measured agreement of the calibrated pyrometer temperature according to this invention with a thermocouple-determined temperature.

The emissivity of the surface of the substrate initially is determined by the substrate itself and at later times by the emissivity of the film-substrate composite, which varies with the film thickness. FIG. 5 shows the calibration curves for this invention as applied to $YBa_2Cu_3O_{7-\delta}$ films on $LaAlO_3$ substrates. The equivalent blackbody temperature plotted along the X axis results from the pyrometer blackbody calibration. According to the foregoing analysis, substrate temperature plotted along the Y axis. While for film thickness less than 0.1 $\mu$m the emissivity variation with film growth shows no effect, for a film thickness of 0.5 $\mu$m an error of 50° K. occurs if the emissivity variation is not accounted for according to this invention. FIG. 6 shows the calibrated pyrometer temperature according to this invention (plotted along the Y axis) compared to an experimentally determined thermocouple temperature of the substrate surface (plotted along the X axis), which indicates close correspondence over varying thicknesses of the film. By thus accounting for the changing emissivity $\epsilon$ with increasing film thickness $d_1$, a close correspondence between the calibrated pyrometer temperature and the actual temperature is achieved. The remaining discrepancy is thought to be caused by the use of room temperature optical constants in the calibration. The use of high-temperature optical constants is expected to yield an even closer agreement. A gold-bonded substrate thermocouple, platinel-II, 25.4 micron, was attached to the surface of the substrate for making the thermocouple measurement (X axis). While the thermocouple measurement allows verification of the accuracy of the calibrated pyrometer measurement, the thermocouple is not practical for use in commercial processing.

The data represented in FIGS. 5 and 6 was experimentally determined with an $LaAlO_3$ substrate and a $YBa_2Cu_3O_6$ film. Because this substrate is transparent for wavelengths smaller than 9.5 $\mu$m (micrometers), the pyrometer wavelength range chosen was from 9.5 to 14 $\mu$m. The optical constants n and k for the film-substrate composite vary with wavelength and are shown graphically in FIG. 7. Similar data is available or can be determined for other materials and/or other wavelengths.

The stoichiometry of the growing film in the chamber depends on the deposition conditions, such as the oxygen partial pressure and the substrate temperature. At temperatures above 400° C. and at low oxygen pressure, $YBa_2Cu_3O_{7-\delta}$ becomes depleted of oxygen. For a processing temperature of about 700° C. and an oxygen partial pressure of 5.3 Pa (argon partial pressure of 13.3 Pa), the growing film is close to the tetragonal phase ($YBa_2Cu_3O_6$). The tetragonal phase is transformed into the super-conducting orthorhombic phase ($YBa_2Cu_3O_7$) during a cooling process in an oxygen environment. These two phases have very different optical properties. The tetragonal phase has a smaller extinction coefficient k than the orthorhombic phase.

Figure 7:
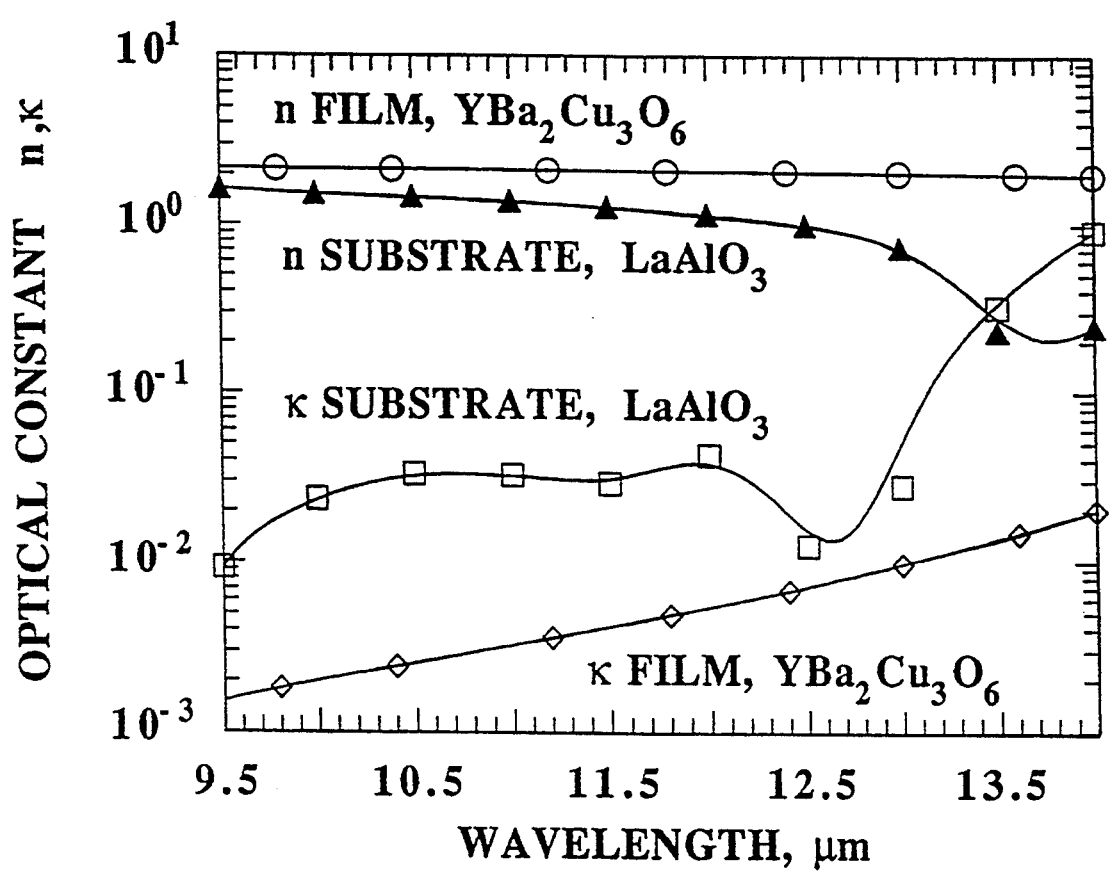
FIG. 7 is a graph showing the optical constants n and k for selected film-substrate composite materials as functions of wavelength.

The optical constants of $YBa_2Cu_3O_6$ set forth in FIG. 7 were determined for measurements taken under controlled oxygen contents. The normal reflectance and normal transmittance were measured at room temperature for wavelengths from 1 to 100 $\mu$m using a Fourier-transform infrared spectrometer. The measured spectra were used to extract the optical constants of the film by applying thin-film optics and fitting measured reflectance data to a Drude-Lorentz model. Since the investigated $YBa_2Cu_3O_{7-\delta}$ film has c-axis normal to the substrate, the measured spectra show the optical properties of ab-plane of crystal structure.

A further description of the experimental procedure and thermal analysis for high-Tc super-conducting films is contained in M. I. Flik et al., "Thermal Analysis and Control for Sputtering Deposition Of High-$T_c$ Superconducting Films," a paper presented at the winter annual meeting of the American Society of Mechanical Engineers, Dallas, Tex., Nov. 25–30, 1990, which is hereby incorporated by reference in its entirety.

Although a preferred embodiment of the invention has hereinbefore been described, it will be appreciated that variations of the invention will be perceived by those skilled in the art, which variations are nevertheless within the scope of the invention as defined by the claims appended hereto.

I claim:

1. Apparatus for controlling the temperature of a surface of a film-substrate composite while the film is undergoing a change in thickness, comprising:

heater apparatus for heating the film-substrate composite;

detector apparatus for detecting radiance from the surface of the film-substrate composite and generating an electronic radiance signal corresponding to the detected radiance;

computing apparatus including means for generating an electronic temperature signal which corresponds to the temperature of the surface of the film-substrate composite, said generating means converting the electronic radiance signal to the electronic temperature signal by use of a radiance/temperature relation comprising:

$$S(t) = C \int_{\lambda_1}^{\lambda_2} \epsilon(\lambda,t) e_b(\lambda,T(t)) R(\lambda) d\lambda = \quad (7)$$

$$C \int_{\lambda_1}^{\lambda_2} e_b(\lambda,T_b(t)) R(\lambda) d\lambda$$

where:

S(t) is the electronic radiance signal at time t, $\epsilon(\lambda,t)$ is the emissivity function at wavelength $\lambda$ and time t and depends on the film thickness $d_1$, where $d_1$ changes with time, T(t) is the real temperature of the film-substrate composite, $T_b$ is the equivalent blackbody temperature of the film-substrate composite, $e_b$ is the blackbody hemispherical emissive power, $\lambda_1$ and $\lambda_2$ are the lower and upper wavelength limits, $R(\lambda)$ is the spectral responsivity, where $R(\lambda) = R_d(\lambda) \tau_o(\lambda)$, $R_d(\lambda)$ is the electronic radiance signal of the detector apparatus per unit energy, where $R_d(\lambda) = dS/d\Phi$, $\tau_o(\lambda)$ is the spectral transmittance of all optical elements, $\Phi$ is the radiance energy arriving at the detector apparatus per unit time, t is time, $\lambda$ is the wavelength of the radiance, and C is a geometric constant based on the detector apparatus and is independent of wavelength; and control apparatus responsive to the electronic temperature signal for controlling the output of the heater apparatus to cause the temperature of the surface of the film-substrate composite to approach a predetermined value.

2. A method for controlling the temperature of a surface of a film-substrate composite while the film is undergoing a change in thickness, comprising:
providing a substrate;
heating the substrate with a heater apparatus;
applying a film to a surface of the substrate to obtain a film-substrate composite;
detecting radiance from the surface of the film-substrate composite and generating an electronic radiance signal corresponding to the detected radiance;
generating an electronic temperature signal, which corresponds to the temperature of the surface of the film-substrate composite, from the electronic radiance signal, wherein a radiance/temperature relation comprises:

$$S(t) = C \int_{\lambda_1}^{\lambda_2} \epsilon(\lambda,t) e_b(\lambda, T(t)) R(\lambda) d\lambda = \quad (7)$$

$$C \int_{\lambda_1}^{\lambda_2} e_b(\lambda, T_b(t)) R(\lambda) d\lambda$$

where:
$S(t)$ is the electronic radiance signal at time t,
$\epsilon(\lambda,t)$ is the emissivity function at wavelength $\lambda$ and time t and depends on the film thickness $d_1$, where $d_1$ changes with time,
$T(t)$ is the real temperature of the film substrate composite,
$T_b$ is the equivalent blackbody temperature of the film-substrate composite,
$e_b$ is the blackbody hemispherical emissive power,
$\lambda_1$ and $\lambda_2$ are the lower and upper wavelength limits,
$R(\lambda)$ is the spectral responsivity, where $R(\lambda) = R_d(\lambda)\tau_o(\lambda)$,
$R_d(\lambda)$ is the electronic radiance signal of the detector apparatus per unit energy, where $R_d(\lambda) = dS/d\Phi$,
$\tau_o(\lambda)$ is the spectral transmittance of all optical elements,
$\Phi$ is the radiance energy arriving at the detector apparatus per unit time,
t is time,
$\lambda$ is the wavelength of the radiance, and
C is a geometric constant based on the detector apparatus and is independent of wavelength; and
controlling the output of the heater apparatus with the electronic temperature signal to cause the temperature of the surface of the film-substrate composite to approach a predetermined value.

3. Apparatus for controlling the temperature of a surface of a film-substrate composite while the film is undergoing a change in thickness, comprising:
heater apparatus for heating the film-substrate composite;
detector apparatus for detecting radiance from the surface of the film-substrate composite and generating an electronic radiance signal corresponding to the detected radiance;
computing apparatus including means for generating an electronic temperature signal which corresponds to the temperature of the surface of the film-substrate composite, said generating means converting the electronic radiance signal to the electronic temperature signal by use of a radiance/temperature relation which includes an emissivity function $\epsilon$ that varies with the wavelength of the radiance and the film thickness and depends on the reflectance R of the film-substrate composite, the emissivity function $\epsilon$ comprising:

$$\epsilon = 1 - R = 1 - \left| \frac{r_1 + r_2 \exp(-2i\delta_1)}{1 + r_1 r_2 \exp(-2i\delta_1)} \right|^2 \quad (8)$$

where:

$$r_1 = \frac{1 - \bar{n}_1}{1 + \bar{n}_1} \quad r_2 = \frac{\bar{n}_1 - \bar{n}_2}{\bar{n}_1 + \bar{n}_2} \quad (9, 10)$$

$$\delta_1 = \frac{2\pi}{\lambda} \bar{n}_1 d_1 \quad (11)$$

and where:
$\bar{n}_1$ is the complex refractive index of the film defined by $\bar{n}_1 = n_1 - ik_1$,
$\bar{n}_2$ is the complex refractive index of the substrate defined by $\bar{n}_2 = n_2 - ik_2$,
$d_1$ is the film thickness which varies over time t,
$k_1$ is the extinction coefficient of the film,
$k_2$ is the extinction coefficient of the substrate,
$r_1$ is the Fresnel coefficient of a film-vacuum interface,
$r_2$ is the Fresnel coefficient of the film-substrate interface,
$\delta_1$ is the phase change across the thickness of the film, and
$\lambda$ is the wavelength of the detected radiance; and
control apparatus responsive to the electronic temperature signal for controlling the output of the heater apparatus to cause the temperature of the surface of the film substrate composite to approach a predetermined value.

4. A method for controlling the temperature of a surface of a film-substrate composite while the film is undergoing a change in thickness, comprising:
providing a substrate;
heating the substrate with a heater apparatus;
applying a film to a surface of the substrate to obtain a film-substrate composite;
detecting radiance from the surface of the film-substrate composite and generating an electronic radiance signal corresponding to the detected radiance;
generating an electronic temperature signal, which corresponds to the temperature of the surface of the film-substrate composite, from the electronic radiance signal, wherein a radiance/temperature relation is used which includes an emissivity function $\epsilon$ which varies with the wavelength of the radiance and the film thickness and depends on the reflectance R of the film-substrate composite, the emissivity function $\epsilon$ comprising:

$$\epsilon = 1 - R = 1 - \left| \frac{r_1 + r_2 \exp(-2i\delta_1)}{1 + r_1 r_2 \exp(-2i\delta_1)} \right|^2 \quad (8)$$

where:

$$r_1 = \frac{1 - \bar{n}_1}{1 + \bar{n}_1} \quad r_2 = \frac{\bar{n}_1 - \bar{n}_2}{\bar{n}_1 + \bar{n}_2} \quad (9, 10)$$

-continued $$\delta_1 = \frac{2\pi}{\lambda} \bar{n}_1 d_1 \quad (11)$$

and where:

$\bar{n}_1$ is the complex refractive index of the film defined by $\bar{n}_1 = n_1 - ik_1$,
$\bar{n}_2$ is the complex refractive index of the substrate defined by $\bar{n}_2 = n_2 - ik_2$,
$d_1$ is the film thickness which varies over time t,
$k_1$ is the extinction coefficient of the film,
$k_2$ is the extinction coefficient of the substrate,
$r_1$ is the Fresnel coefficient of a film-vacuum interface,
$r_2$ is the Fresnel coefficient of the film-substrate interface,
$\delta_1$ is the phase change across the thickness of the film, and
$\lambda$ is the wavelength of the detected radiance; and
controlling the output of the heater apparatus with the electronic temperature signal to cause the temperature of the surface of the film-substrate composite to approach a predetermined value.

* * * * *